US006948055B1

(12) United States Patent
Talcott (10) Patent No.: US 6,948,055 B1
(45) Date of Patent: Sep. 20, 2005

(54) ACCURACY OF MULTIPLE BRANCH PREDICTION SCHEMES

(75) Inventor: Adam R. Talcott, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 946 days.

(21) Appl. No.: 09/685,270

(22) Filed: Oct. 9, 2000

(51) Int. Cl.[7] ............................................. G06F 9/38
(52) U.S. Cl. ..................................................... 712/239
(58) Field of Search ............................... 712/236, 239, 712/240, 238

(56) References Cited

U.S. PATENT DOCUMENTS

| 5,434,985 A | 7/1995 | Emma et al. ............... 395/375 |
| 5,805,878 A | 9/1998 | Rahman et al. ............ 395/586 |

FOREIGN PATENT DOCUMENTS

EP 0 605 876 A1 7/1994

OTHER PUBLICATIONS

PCT International Search Report, May 15, 2002, 5 pages.
Yeh, Tse-Yu and Patt, Yale, N., "A Comparison of Dynamic Branch Predictors that use Two Levels of Branch History", Department of Electrical Engineering and Computer Science, The University of Michigan; pp. 257-266, Undated.
Wallace, Steven and Bagerzadeh, Nader, "Multiple Branch and Block Prediction", Department of Electrical and Computer Engineering, University of California, Irvine; pp. 1-10, Undated.

*Primary Examiner*—William M. Treat
(74) *Attorney, Agent, or Firm*—Osha Liang LLP (57) ABSTRACT

A method and apparatus of improving prediction accuracy of a branch instruction scheme includes reading an individual instruction in a current set of instructions, fetching the individual instruction when an instruction fetch unit determines that the individual instruction is valid, and allowing the instruction fetch unit to use an index address for the fetched individual instruction. A method and apparatus of improving branch prediction accuracy includes receiving a set of instructions having an assigned address, making a prediction for a branch instruction in the set of instructions using the assigned address, and retaining the assigned address for the branch instruction in the set of instructions.

11 Claims, 5 Drawing Sheets

ACCURACY OF MULTIPLE BRANCH PREDICTION SCHEMES

BACKGROUND OF THE INVENTION

Figure 1:
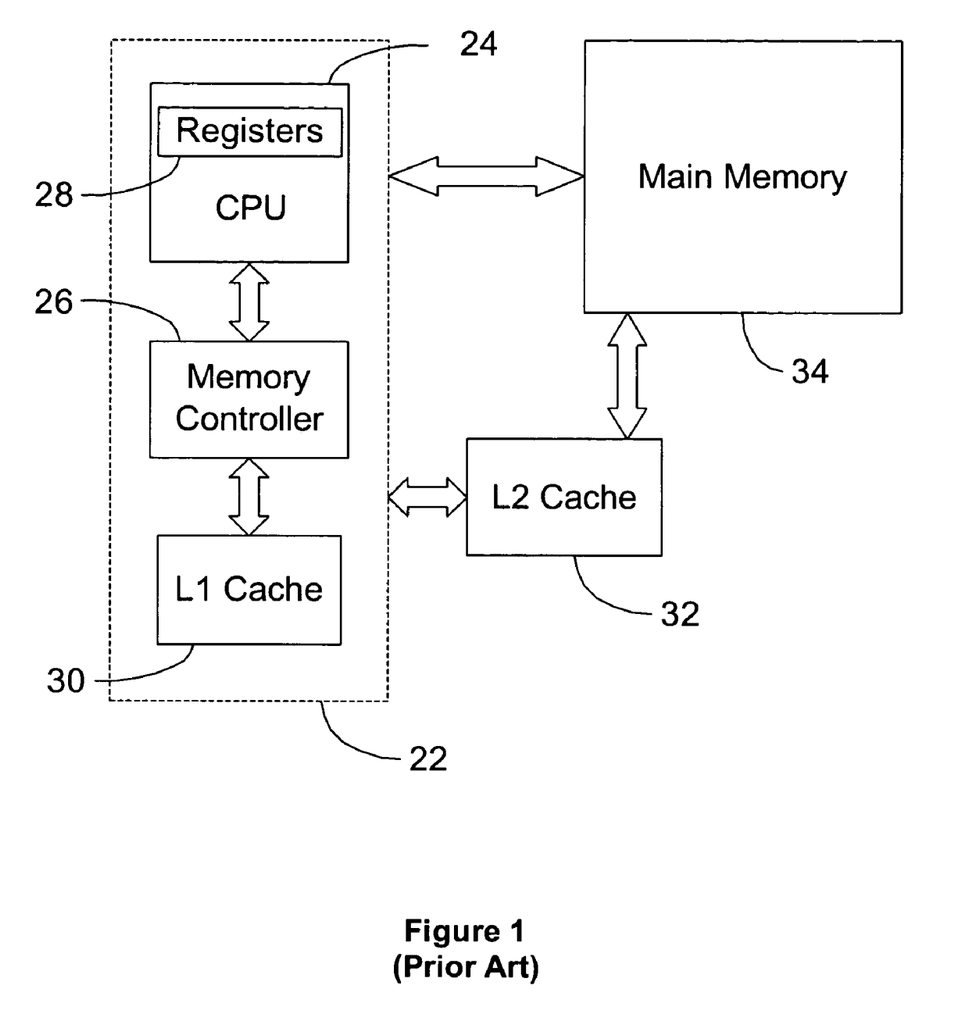
FIG. 1 shows a typical computer system.

Computer processors contain arithmetic, logic, and control circuitry that interpret and execute instructions from a computer program. Referring to FIG. 1, a typical computer system includes a microprocessor (22) having, among other things, a CPU (24), a memory controller (26), and an on-board cache memory (30). The microprocessor (22) is connected to external cache memory (32) and a main memory (34) that both hold data and program instructions to be executed by the microprocessor (22). Internally, the execution of program instructions is carried out by the CPU (24). Data needed by the CPU (24) to carry out an instruction are fetched by the memory controller (26) and loaded into internal registers (28) of the CPU (24). Upon command from the CPU (24), the memory controller (26) searches for the data first in the fast on-board cache memory (30), then in external cache memory (32), and finally in the slow main memory (34). Finding the data in the cache memory is referred to as a "hit." Not finding the data in the cache memory is referred to as a "miss."

The time between when a CPU requests data and when the data is retrieved and available for use by the CPU is termed the "latency" of the system. If requested data is found in cache memory, i.e., a data hit occurs, the requested data can be accessed at the speed of the cache and the latency of the system is reduced. If, on the other hand, the data is not found in cache, i.e., a data miss occurs, and thus the data must be retrieved from main memory for access and the latency of the system is increased.

In the pursuit of improving processor performance, designers have sought two main goals: making operations faster and executing more operations in parallel. Making operations faster can be approached in several ways. For example, transistors can be made to switch faster and thus propagate signals faster by improving semiconductor processes; execution-unit latency can be reduced by increasing the number of transistors in the design; and the levels of logic required by the design to implement a given function can be minimized to increase speed. To execute more operations in parallel, designers mainly rely on one, or a combination of pipelining and superscalar techniques. Pipelined processors overlap instructions in time on common execution resources. Superscalar processors overlap instructions in space on separate resources.

Pipeline stalls are a main performance inhibitor with regard to parallel processing. Stalls arise from data dependencies, changes in program flow, and hardware resource conflicts. At times, pipeline stalls can be avoided by rearranging the order of execution for a set of instructions. Compilers can be used to statically reschedule instructions. However, incomplete knowledge of run-time information reduces the effectiveness of static rescheduling. In-order processors, i.e., processors that issue, execute, complete, and retire instructions in strict program order, have to rely entirely on static rescheduling and thus are prone to pipeline stalls.

As a result, designers use out-of-order processors and seek to implement dynamic instruction rescheduling. The simplest out-of-order processors issue instructions in order but allow them to execute and complete out of order. Even these simple out-of-order processors require complex hardware to reorder results before the corresponding instructions are retired. A strict result order is not required from a data-flow perspective. However, such ordering is necessary to maintain precise exceptions and to recover from mispredicted speculative execution.

A well-known method of reordering is through the use of a reorder buffer, i.e., a buffer that maintains results until written to the register file in program order. Designers also use other types of reordering hardware, such as history buffers and future files. History buffers record source-operand history so the processor can backtrack to a precise architectural state and future files store the current state and the architectural state in separate register files allowing the processor to be restored to a precise check-point state.

Branch prediction and speculative execution are additional techniques used to reduce pipeline stalls. In a pipelined processor, the outcomes of branch instructions are often determined after subsequent instructions have been fetched. Using branch prediction schemes, microprocessors attempt to accurately predict whether a branch is taken or not based on how that branch has behaved previously. The aggregate behavior, or the average behavior over time, of the branch instruction is stored in a Branch Prediction Table ("BPT"). Given a branch instruction's aggregate behavior, the branch predictor, which resides in an instruction fetch unit, predicts the outcome of the branch instruction and then loads instructions thereafter based on that prediction. For example, if the branch predictor predicts that a branch will be taken, then the processor fetches subsequent instructions according to the address to which the instruction branches. When the branch proceeds in the predicted direction, pipeline stalls are completely avoided. On the other hand, if the branch direction is mispredicted, all the instructions after the mispredicted instruction must be removed from the processor.

Modern microprocessors incorporate a variety of branch prediction schemes. These schemes usually fall under one of two broad classifications: static branch prediction and dynamic branch prediction. Static branch prediction occurs when a branch predictor makes predictions that are not based on the run-time behavior of branch instructions. Two such schemes are: "predict not taken" and "predict taken." In the "predict not taken" scheme, a branch is predicted as not taken, and the processor simply continues as if the branch did not exist. In the "predict taken" scheme, as soon as the branch is decoded and the target address of the next instruction is predicted, it is assumed that the branch is taken and the process continues with the fetching and executing of instructions at the target address.

Dynamic branch prediction, on the other hand, occurs when the processor responds to changes in a branch instruction's behavior while a program is executing. In other words, a dynamic branch prediction scheme provides a mechanism by which a processor can take into account the cumulative behavior of a branch instruction. In cases where there are more than one branch instruction in an instruction bundle, also known as a fetch bundle, some schemes may break the fetch bundle at the points where additional branch instructions reside.

Typically, dynamic branch prediction schemes are extended to predict multiple branches. The increasing number of instructions executed per cycle in high-performance microprocessors calls for the instruction fetch unit to fetch a correspondingly larger number of instructions each cycle. Fetching more instructions per cycle increases the likelihood that more than one branch prediction will need to be made each cycle to determine the next fetch address. Accordingly, a microprocessor handles multiple branch instructions through a multiple branch prediction scheme.

Multiple branch prediction schemes usually depend upon a fetch bundle address (FBA), i.e., the address of the first instruction fetched in a given cycle, to index all prediction structures for the fetched instruction bundle. Each branch to be predicted in the current fetch bundle uses information from the prediction structures indexed by the address of the bundle currently being fetched. In other words, an instruction uses its fetch bundle address to base its index address, which it uses to index a branch prediction structure.

An index based upon the fetch bundle address has typically been used to select several prediction counters from which multiple branch predictions are made dependent upon the location of the branches in the fetch bundle. These counters may be simple two-bit counters with saturation. Typically, the counter is incremented when the branch instruction is taken and it is decremented when the instruction is not taken. For example, the branch instruction could be taken if the counter is in state 2 or 3, and not taken if the counter is in state 0 or 1. The saturation attribute inhibits the counter from recycling. For example, if the counter is in state 3 and a branch instruction is taken, the counter will stay in state 3 and not increment back to state 0. This mechanism attempts to predict branch instructions by gathering and representing the aggregate behavior of previous branch instructions. Improvements made to this mechanism include using branch history so that the processor recognizes repetitive patterns in previous branch instructions to predict later branch instructions.

Typically, branch history mechanisms are separated into two types: global branch history and local branch history. Global branch history pertains to the last g outcomes of executed branch instructions. Local branch history incorporates the last l outcomes of the current branch instruction.

Branch instructions can either be conditional or unconditional. All conditional branch instructions and most unconditional branch instructions can be incorporated into branch history registers. However, some unconditional branch instructions, such as call and return statements, are usually not incorporated into branch history registers. Global branch history prediction schemes have been extended to predict the outcomes of multiple branch instructions. Additionally, in order to predict multiple conditional branch instructions simultaneously, the BPT is typically extended to contain several n-bit counters per entry. Depending on the location of branches in the current fetch bundle, the proper n-bit counters are referenced to make the multiple branch predictions.

Figure 2:
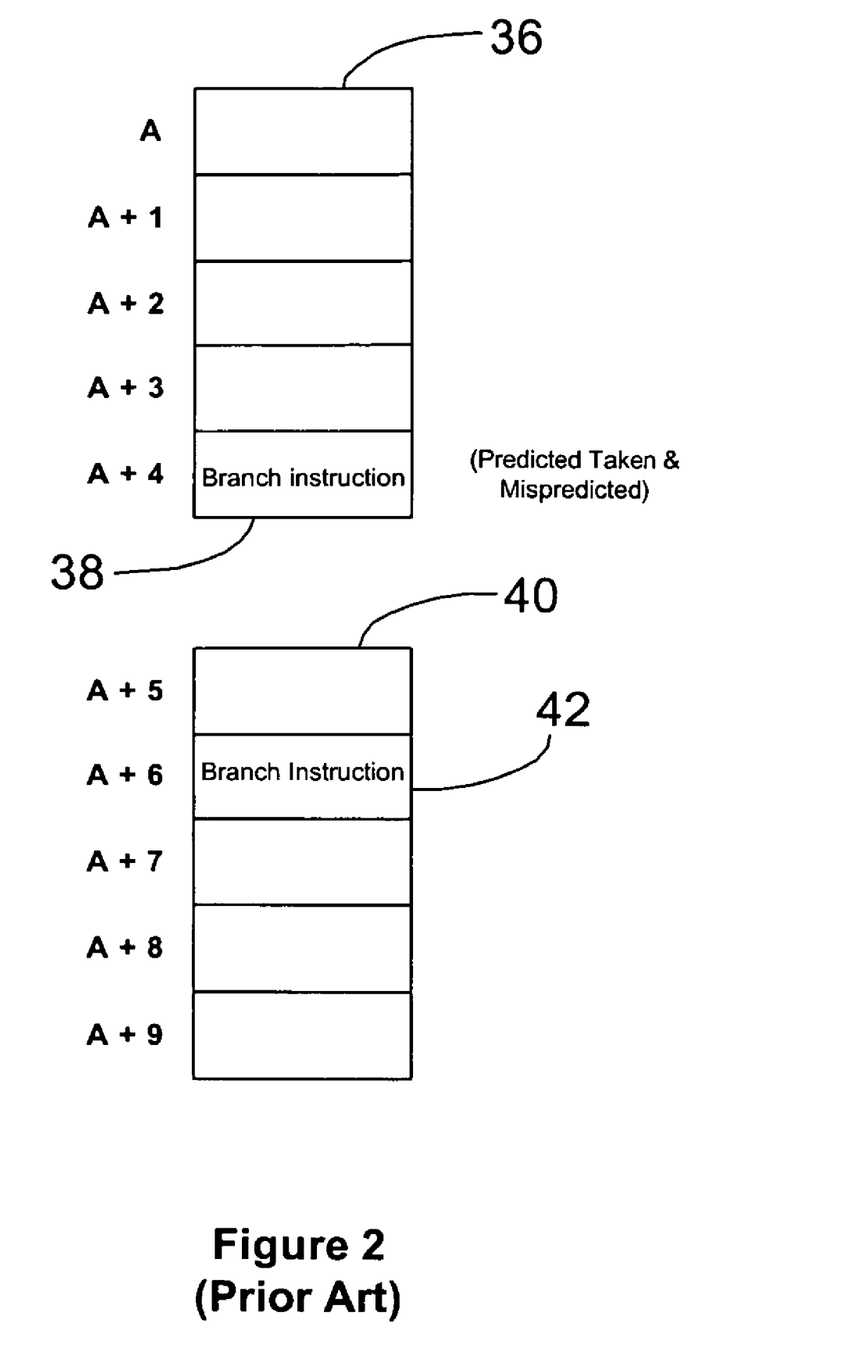
FIG. 2 is a block diagram of an exemplary instruction bundle.

FIG. 2 depicts instruction addresses A through A+9, which constitute an exemplary instruction fetch bundle. An instruction address is the location of where an instruction resides in memory. The two exemplary instruction fetch blocks are indexed A (36) and A+5 (40). If the branch instruction resides at A+4 (38), and the branch is predicted taken and mispredicted, the instruction at A+6 (42) uses A+5 (40) as its index address. Alternatively, if a branch instruction is mispredicted, then a subsequent branch instruction depends on a new fetch bundle address to base its index address. Therefore, the prediction information associated with the subsequent branch instruction is different than the prediction information it would have used if it used a prior fetch bundle address. This is due to the fact that the subsequent branch instruction uses prediction information that is based on a newly indexed branch prediction table. One skilled in the art will appreciate that the described method is illustrative of one typical indexing method and, depending on the processor architecture, other methods can be used to index instructions.

SUMMARY OF THE INVENTION

In one aspect, a method of improving the prediction accuracy of a branch prediction scheme comprises reading an individual instruction in a current set of instructions, fetching the individual instruction when an instruction fetch unit determines that the individual instruction is valid, and allowing the instruction fetch unit to use an index address for the fetched individual instruction.

In one aspect, a method of improving branch prediction accuracy comprises receiving a set of instructions having an assigned address, making a prediction for a branch instruction in the set of instructions using the assigned address, and retaining the assigned address for the branch instruction in the set of instructions.

In one aspect, a tool for improving prediction accuracy of a branch prediction scheme comprises a processor for reading an individual instruction in a current set of instructions, and an instruction fetch unit for determining whether the individual instruction is valid and fetching the individual instruction when the individual instruction is valid, wherein an index address is used for the fetched individual instruction.

In one aspect, a tool of improving branch prediction accuracy comprises a set of instructions having an assigned address, and a branch predictor for making a prediction for a branch instruction in the set of instructions using the assigned address, wherein the assigned address for the branch instruction in the set of instructions is retained.

In one aspect, an apparatus for improving prediction accuracy of a branch instruction scheme comprises means for reading an individual instruction in a current set of instructions, means for fetching the individual instruction when an instruction fetch unit determines that the individual instruction is valid, and means for allowing the instruction fetch unit to use an index address for the fetched individual instruction.

In one aspect, an apparatus for improving branch prediction accuracy comprises means for receiving a set of instructions having an assigned address, means for predicting an outcome for a branch instruction in the set of instructions using the assigned address, and means for retaining the assigned address for the branch instruction in the set of instructions.

Other advantages and features will become apparent from the following description, including the figures and the claims.

DETAILED DESCRIPTION

Figure 3:
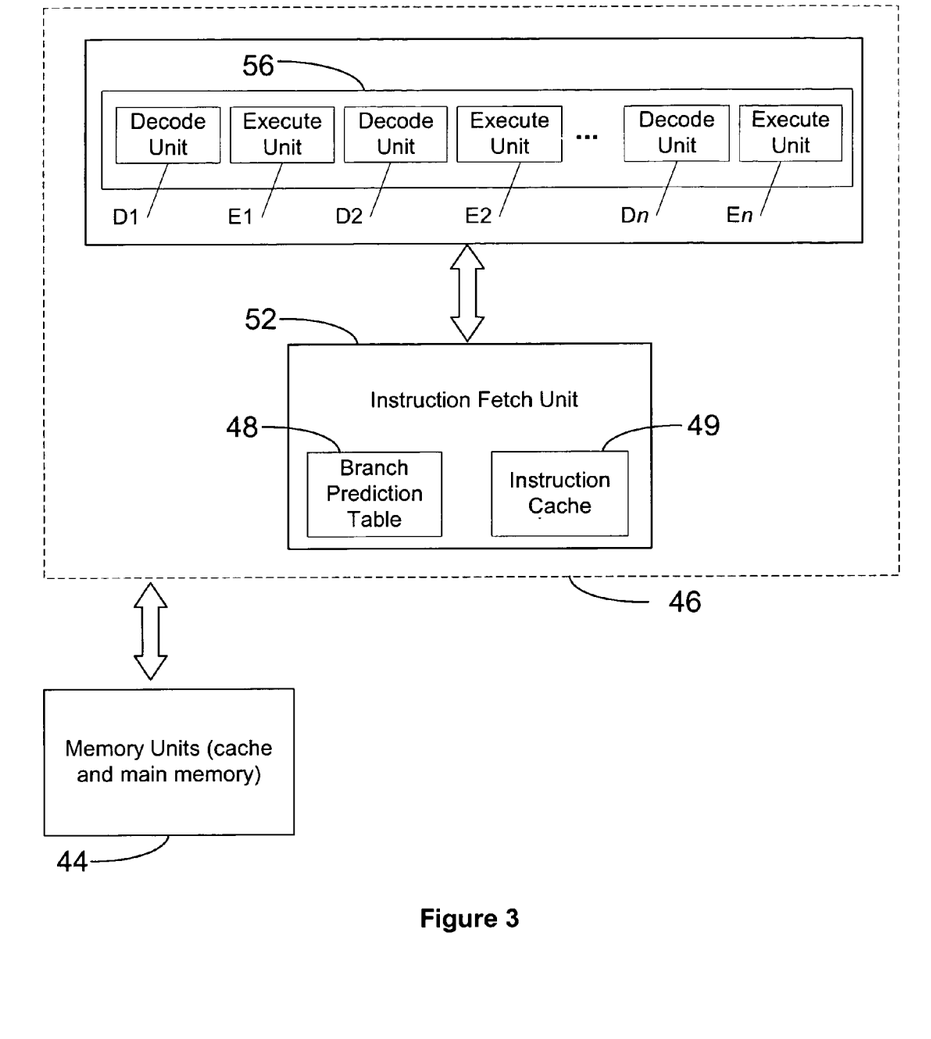
FIG. 3 shows a computer system in accordance with an embodiment of the present invention.

The present invention relates to a system for improving the accuracy of multiple branch prediction schemes. Referring to the drawings wherein like reference characters are used for like parts throughout the several views, FIG. 3 is a computer system in accordance with an embodiment of the present invention. The system encourages the correct prediction behavior from branch prediction structures, which comprise prediction information, by maintaining the proper index components for all branch prediction structures even in the presence of mispredictions. In one aspect, the accuracy of a branch prediction scheme is increased by using the same prediction information to predict a branch instruction subsequent to a mispredicted branch instruction that would have been used if the mispredicted instruction had been correctly predicted.

Referring to FIG. 3, a system in accordance with an embodiment of the present invention includes a microprocessor (46) having an instruction pipeline (56), and an instruction fetch unit (52) having a branch prediction table ("BPT") (48) and an instruction cache (49). Also, the system interfaces with memory units (44) similar to the microprocessor described in FIG. 1. The instruction pipeline (56) consists of a series of Decode units (D1 . . . Dn) and Execution units (E1 . . . En).

As instructions become available to the pipeline (56), the pipeline (56) decodes and executes the instructions. The instruction fetch unit (52) reads out history information when an instruction bundle needs to be fetched. Typically, an index based upon a fetch bundle address is used to select several prediction counters in the BPT (48) from which multiple predictions are made based upon the location of branches in a fetch bundle.

Figure 4:
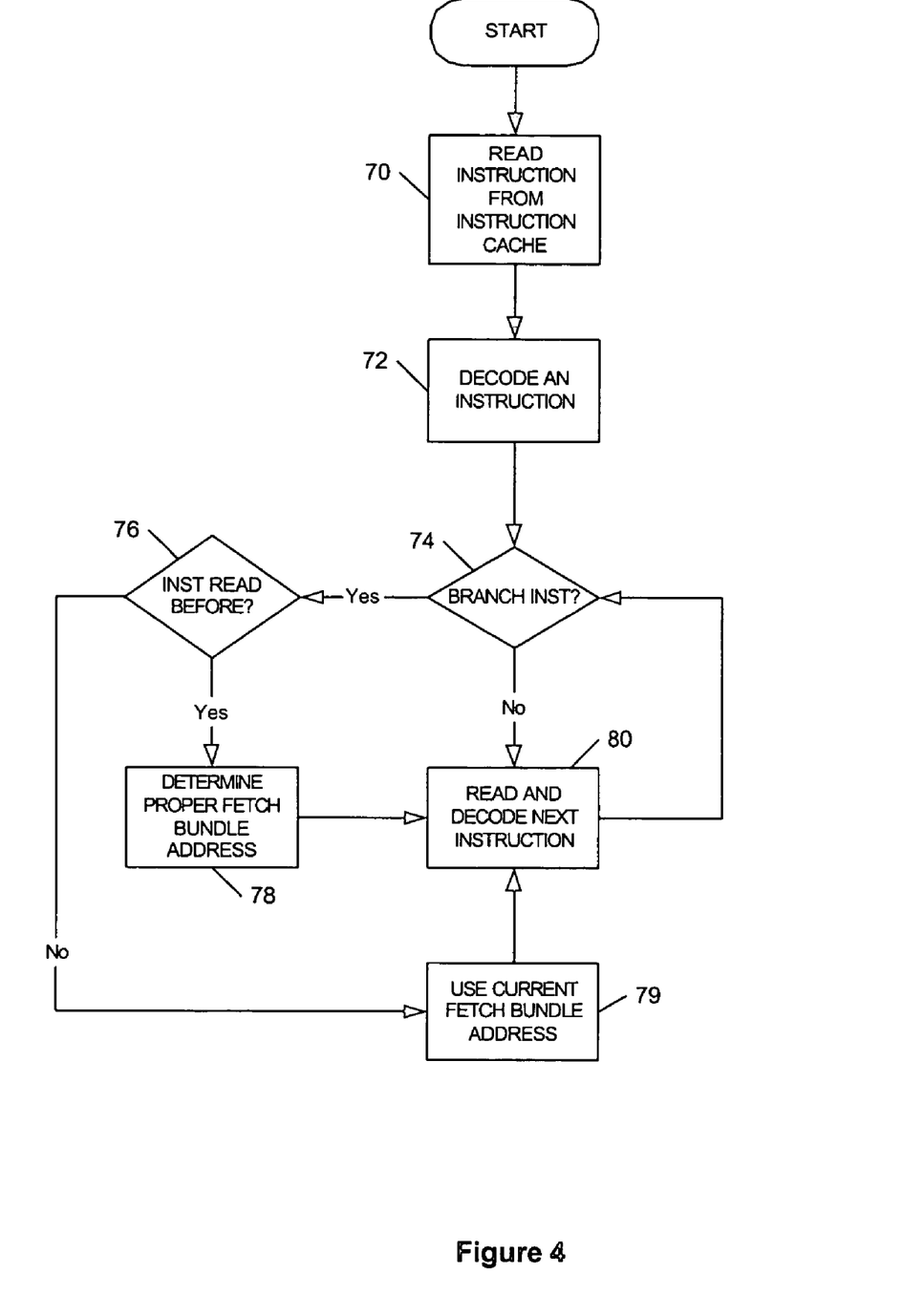
FIG. 4 is a flow chart describing a branch instruction indexing process in accordance with the present invention.

FIG. 4 is a flow diagram of an exemplary branch instruction indexing process in accordance with an embodiment of the present invention. Initially, as an instruction fetch unit begins to read individual instructions sequentially from an instruction cache for a given cycle (step 70), the instruction fetch unit decodes each individual instruction (step 72). Those skilled in the art will appreciate that in other embodiments, the instruction fetch unit instead of decoding an instruction may use pre-decode information, i.e., decode information that is computed as instructions are written into the instruction cache in the instruction fetch unit and before the instruction reaches branch prediction logic. As instructions are individually read and validated by the instruction fetch unit, the instructions are subsequently said to be processed, i.e., fetched, and form an instruction 11 fetch bundle. Validating an instruction comprises, among other things, making sure the instruction does not follow a predicted taken branch. Associated with the instruction fetch bundle is a fetch bundle address. The fetch bundle address is the address of the first instruction fetched for the given cycle. If the decode information for a particular instruction reveals that the instruction is not a branch instruction (step 74), the instruction fetch unit processes the instruction and proceeds with reading and decoding the next instruction in the instruction cache (step 80). However, if the decode information indicates that the instruction is a branch instruction (step 74), the instruction fetch unit must make a prediction as to whether or not the branch instruction branches. To make the prediction, the instruction fetch unit must determine a proper address to use to index a branch prediction structure.

In determining the proper index address for the branch instruction, the instruction fetch unit must determine whether the branch instruction was read before when a prior instruction fetch bundle (step 76) was formed. If the branch instruction was not read in a previous cycle (step 76), the instruction fetch unit processes the instruction, wherein the branch instruction becomes part of an instruction fetch bundle, and then uses the fetch bundle address of that instruction fetch bundle (step 79) to index a branch prediction structure. However, if the instruction fetch unit read the branch instruction in a prior cycle (step 76), the instruction fetch unit makes a further determination as to the proper fetch bundle address the branch instruction should use (step 78) when indexing a branch prediction structure to make a prediction for the branch instruction. In other words, the instruction fetch unit determines what the fetch bundle address was when the branch instruction was first read.

For example, when an instruction fetch unit reads and processes a set of 8 instructions (hereafter referred to as the "original" instruction set), and where the second (the "first" branch instruction) and fifth (the "next" branch instruction) instructions in the original instruction set are branch instructions, if the first branch instruction is predicted taken and mispredicted, the next branch instruction is removed from the instruction fetch unit. That is, because of the misprediction, all instructions that were read after the mispredicted instruction are removed from the instruction fetch unit, and consequently, the instruction fetch unit does not process the removed instructions. Thereafter, when the next branch instruction in the original instruction set is re-fetched as part of another instruction fetch bundle, the instruction fetch unit determines that the re-fetched branch instruction should use the fetch bundle address that would have been used if the first branch instruction were predicted correctly. The process is explained in further detail below.

Those skilled in the art will appreciate that the exemplary flow process shown in FIG. 4 is equally applicable to a plurality of instructions being processed in parallel. Further, while, for purposes of illustration, steps are depicted occurring in series, those skilled in the art will appreciate that, according to dependency, certain steps may occur simultaneously.

Figure 5:
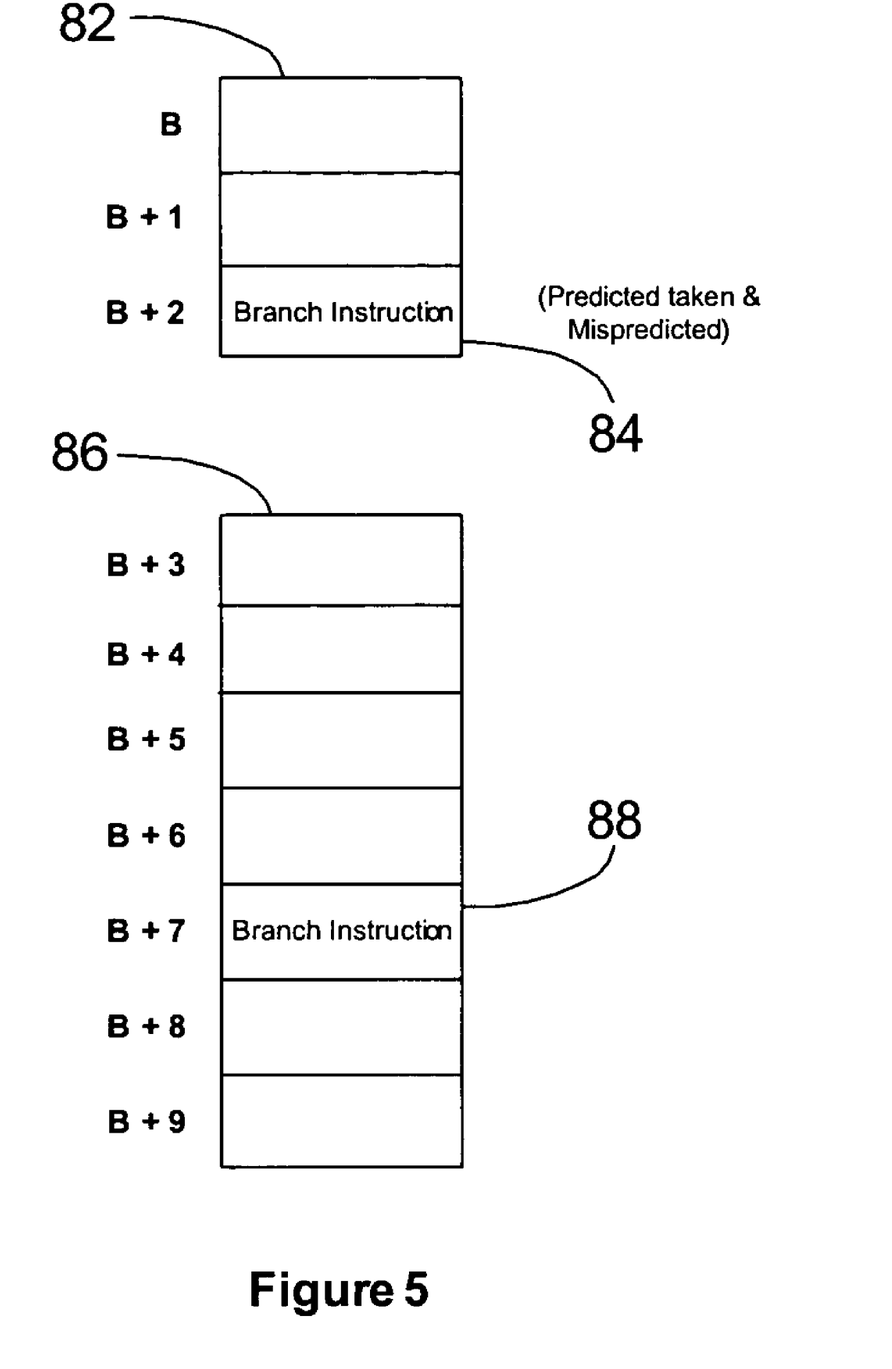
FIG. 5 is a block diagram of an exemplary instruction bundle.

FIG. 5 represents an instruction sequence from addresses B through B+9, with a corresponding fetch bundle address of B (82). In a system in accordance with an embodiment of the present invention, if a misprediction occurs for the branch instruction at B+2 (84), then the next branch instruction occurring at B+7 (88) uses B (82) as its index. One skilled in the art will appreciate that although the initial misprediction causes the instruction fetch unit to fetch a new bundle of instructions with a new fetch bundle address, i.e., B+3 (86), the instruction that initially occurred at B+7 (88) still uses B (82) as its index.

Accordingly, the second branch instruction at B+7 (88) uses the initial index address of B (82), and therefore, the branch predictor becomes more quickly trained because the branch predictor uses the prediction information that would have been used if an accurate prediction was made. That is, the counters associated with the branch instruction at B+7 (88) more quickly reflect the true behavior of the instruction without the deviation that might have occurred had the branch instruction at B+7 (88) used the B+3 (86) index because when B+2 (84) is later correctly predicted, B+7 (88) uses B (82) again. Those skilled in the art will appreciate that because the branch predictor becomes more quickly trained, the chances of mispredictions decrease. This is due to the fact that once a particular branch is correctly predicted, the fetch bundle is not broken and a subsequent branch uses a portion of the prediction information that was used the previous times the branch was first encountered.

Further, by training a branch predictor to behave in the manner in which the predictor would have behaved if a preceding branch instruction had not been mispredicted, the branch predictor is more quickly trained, and therefore the overall accuracy of the branch prediction scheme increases. Once the initial instruction bundle is fetched, all branch instructions contained within that fetch bundle will have the same index, i.e., the proper fetch bundle address. When a branch instruction after a mispredicted branch instruction is removed due to a misprediction, the branch instruction uses the fetch bundle address that it would have used if the misprediction did not occur to base its index address when fetched again in a different instruction bundle with a new fetch bundle address.

Because the system allows instructions to use the fetch bundle address which would have been used if a prior misprediction had not occurred, the corresponding branch prediction table is manipulated as if the microprocessor did not make a misprediction. This allows a branch predictor to adhere to the natural behavior of the instruction and not a behavior that is altered due to mispredictions. Further, by having the branch predictor determine which fetch bundle address a branch instruction should use, branch instructions can use proper fetch bundle addresses and therefore, the corresponding indexes allow the microprocessor to refer to the originally indexed branch prediction structure entries for the instructions. Because of this, prediction counters associated with the instructions more quickly go to a state that more accurately represents their natural behavior. Those skilled in the art will appreciate that in other embodiments, the prediction process applies to other branch predictors, such as address predictors.

Advantages of the present invention may include one or more of the following. In one or more embodiments of the present invention, a branch instruction is allowed to use an index address that it would have used if prior mispredictions did not occur. Therefore, a branch prediction table associated with a particular branch instruction more quickly reflects the instruction's behavior. Further, because the branch prediction table becomes more accurate quicker, fewer mispredictions will occur. As the amount of mispredictions a microprocessor makes is decreased, the performance of the system is increased. Those skilled in the art will appreciate that the present invention also may include other advantages and features.

While the present invention has been described with respect to a limited number of preferred embodiments, those skilled in the art will appreciate numerous modifications and variations therefrom. The appended claims are intended to cover all such modifications and variations which occur to one of ordinary skill in the art.

What is claimed is:

1. A method of improving branch prediction accuracy, comprising:
    receiving a set of instructions having an assigned address;
    making a prediction for a branch instruction in the set of instructions using the assigned address;
    retaining the assigned address for the branch instruction in the set of instructions;
    making a prediction for an other branch instruction in the set of instructions using the assigned address;
    retaining the assigned address for the other branch instruction in the set of instructions; and
    when the branch instruction is mispredicted,
        removing the set of instructions having the assigned address,
        receiving a second set of instructions having a second assigned address,
        recognizing a branch instruction in the second set of instructions as a branch instruction in the removed set of instructions, and
        making a prediction for the recognized branch instruction using the assigned address of the removed set of instructions.

2. The method of claim 1, wherein the assigned address is a fetch bundle address.

3. A tool of improving branch prediction accuracy, comprising:
    a set of instructions having an assigned address;
    a branch predictor for making a prediction for a branch instruction in the set of instructions using the assigned address,
    wherein the assigned address for the branch instruction in the set of instructions is retained, and
    wherein the branch predictor is further for making a prediction for another branch instruction in the set of instructions using the assigned address, wherein the assigned address for the other branch instruction in the set of instructions is retained;
    a second set of instructions having a second assigned address; and
    an instruction fetch unit for:
        removing the set of instructions having the assigned address, and
        recognizing a branch instruction in the second set of instructions as a branch instruction in the removed set of instructions,
        wherein the branch predictor makes a prediction for the recognized branch instruction using the assigned address of the removed set of instructions.

4. The tool of claim 3, wherein the address is a fetch bundle address.

5. The tool of claim 3 wherein the prediction made is a prediction of an outcome of the branch instruction.

6. A method of processing instructions, comprising:
    receiving a current set of instructions having an assigned address;
    determining whether a branch instruction in the current set of instructions was read prior to the receiving; and
    if the branch instruction was read prior to the receiving, predicting an outcome of the branch instruction using an assigned address of a previous set of instructions in which the branch instruction was read.

7. The method of claim 6, further comprising:
    if the branch instruction was not read prior to the receiving, predicting an outcome of the branch instruction using the assigned address of the current set of instructions.

8. A computer-readable medium comprising software instructions executed to:
    receive a current set of instructions having an assigned address;
    determine whether a branch instruction in the current set of instructions was read prior to the receiving; and
    if the branch instruction was read previously, predict an outcome of the branch instruction using an assigned address of a previous set of instructions in which the branch instruction was read.

9. The computer-readable medium of claim 8, further comprising software instructions executed to:
    if the branch instruction was not read previously, predict an outcome of the branch instruction using the assigned address of the current set of instructions.

10. An apparatus, comprising:
    means for receiving a current set of instructions having an assigned address;

means for determining whether a branch instruction in the current set of instructions was read prior to the receiving;

if the branch instruction was read previously, means for predicting an outcome of the branch instruction using an assigned address of a previous set of instructions in which the branch instruction was read.

11. The apparatus of claim 10, further comprising:

if the branch instruction was not read previously, means for predicting an outcome of the branch instruction using the assigned address of the current set of instructions.

* * * * *